Oct. 27, 1970    C. L. PRUITT ET AL    3,535,768
METHOD FOR PRODUCING WELDED BEAMS
Filed Sept. 11, 1967    2 Sheets-Sheet 1
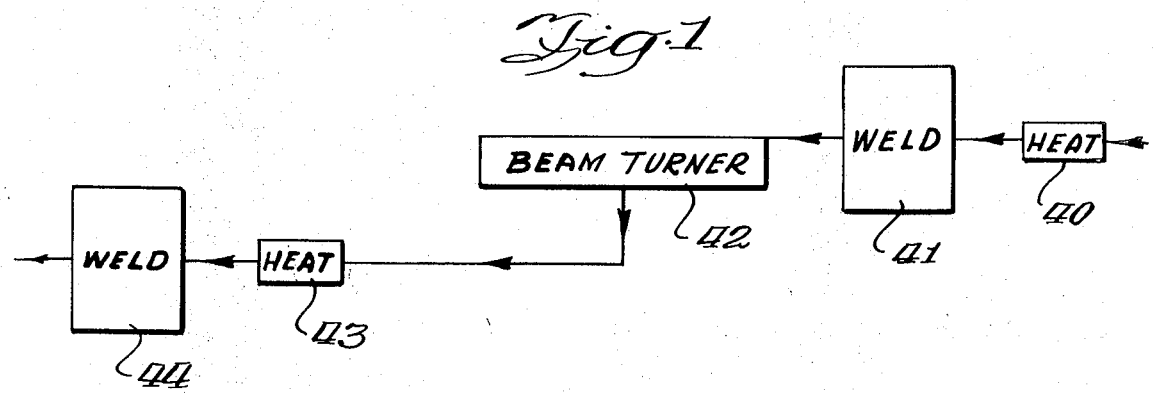
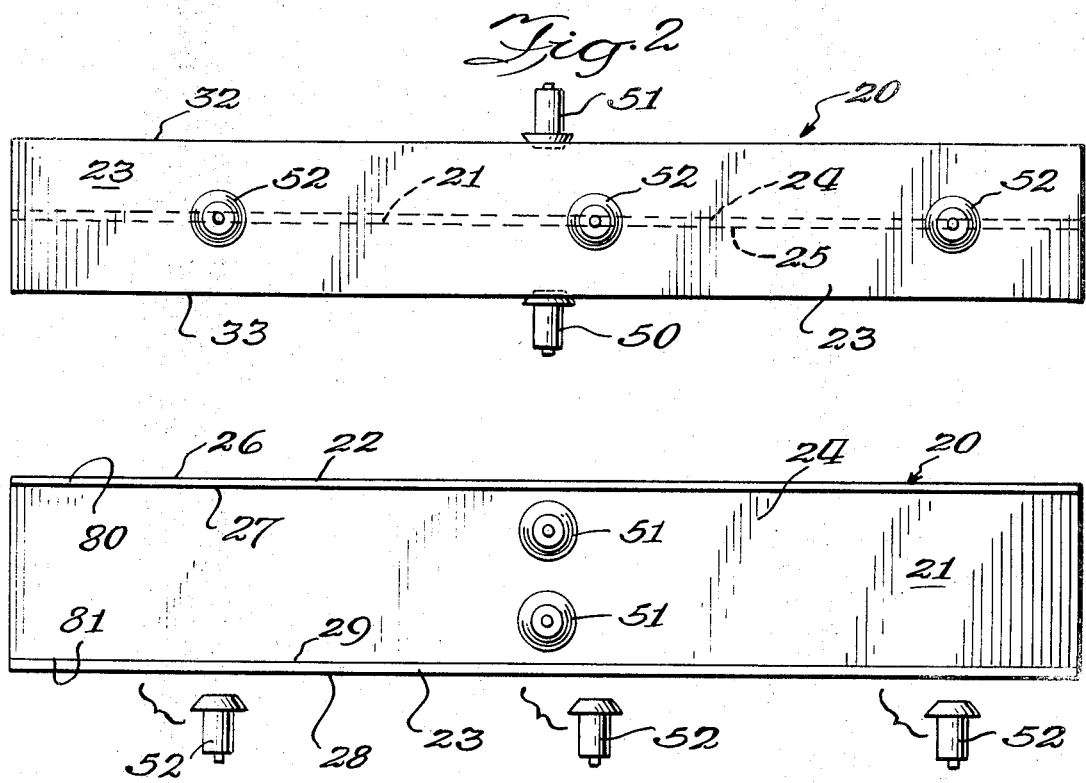
INVENTORS
Carey L. Pruitt
Norbert W. Delacey
Paul Shattuck
George Mersot
Edward Fabrici
BY Merriam, Marshall, Shapiro & Klose
ATTORNEYS Oct. 27, 1970    C. L. PRUITT ET AL    3,535,768
METHOD FOR PRODUCING WELDED BEAMS
Filed Sept. 11, 1967    2 Sheets-Sheet 2

INVENTORS
Carey L. Pruitt
Norbert W. Delacey
Paul Shattuck
George Mersot
Edward Fabrici BY Merriam, Marshall, Shapiro & Klose
ATTORNEYS

3,535,768
METHOD FOR PRODUCING WELDED BEAMS
Carey L. Pruitt, Hammond, Ind., Norbert W. Delacey,
Calumet City, Ill., and Paul Shattuck, Highland, George
Mersot, Gary, and Edward Fabrici, Crown Point, Ind.,
assignors to Inland Steel Company, Chicago, Ill., a corporation of Delaware
Filed Sept. 11, 1967, Ser. No. 666,797
Int. Cl. B23k *31/02*
U.S. Cl. 29—471.1                                     15 Claims

ABSTRACT OF THE DISCLOSURE

Welded structure shape, such as a beam, produced by moving a horizontally disposed web portion and a pair of opposed, vertically disposed flange portions longitudinally past a welding station at which opposite edges of web portion are welded from above to flange portions. Supplemental heating of shape, before cooling following welding, but not after welding, to provide the entire cross-section of the shape with a substantially uniform temperature at the beginning of cooling following welding. Prevents web buckle and sweep and camber of the shape.

BACKGROUND OF THE INVENTION

The present invention relates generally to a method for producing welded structural shapes and more particularly to a method for producing welded structural shapes, such as beams, which are free of web buckle and camber and sweep.

Welded beams consist of a web portion having a pair of opposite edges each welded to a respective one of a pair of flange portions. The flange portions may have the same or different thicknesses and the same or different widths. The web may be centered relative to the flange portions or it may be off-center.

In a conventional method for producing a welded beam, a web portion, in a horizontal disposition, and a pair of opposed flange portions, in vertical dispositions, are moved longitudinally past a first welding station at which opposite edges of the web portion are each continuously welded, from above, to a respective one of the flange portions. This produces a partially welded beam in which one side of the web portion is welded to the flange portions; and the partially welded beam is then turned over, and the abovedescribed welding operation is repeated to weld the opposite side of the web portion to the flange portions.

A problem arises in connection with the production of a welded beam having a relatively large depth (e.g., greater than 20 inches) together with a relatively thin web (e.g., one-half inch or less), a beam of these dimensions being sometimes called a "girder section." As a result of welding, the flange portions are heated to a higher temperature than the center of the web portion; and the flange portions expand relative to the center of the web portion. Upon cooling following welding, the flange portions and the outer edges of the web portion contract; and these contractions, in a direction parallel to the lengthwise dimension of the web portion develop a compressive force on the center of the web portion.

A beam having a given longitudinal slenderness ratio (length/cross-sectional area) will resist a given compressive force before buckling. The smaller the ratio, the greater the resistance.

The longitudinal slenderness ratio of a welded girder section is such that the center of the web portion will oftentimes buckle as a result of the compressive forces developed during cooling following a welding operation in which the flange portions are heated to a higher temperature than the center of the web portion.

Another problem which occurs during the production of welded beams is beam camber, a condition reflected by curvature of the flange portions out of the flat planes in which they normally lie, so that one of the flange portions is convexly curved on the outside and the other flange portion is concavely curved on the outside. Camber may occur when one of the flange portions is heated to a substantially higher temperature than the other flange portion; and a beam is especially sensitive to camber when one of the flange portions is thicker, or has a greater cross-sectional area, than the other flange portion. During the welding operation, or during a supplemental heating operation incident to the welding operation, the temperature of the flange portion having the smaller cross-sectional area may substantially exceed the temperature of the flange portion having the larger cross-sectional area.

Still another problem which may arise during production of welded beams is beam sweep, a condition reflected by curvature of the web portion out of the straight plane in which the web portion normally lies. In such a condition, one edge on each flange portion is convexly curved and the opposite edge on each flange portion is concavely curved. Sweep may occur when one edge of the flange portion is heated to a higher temperature than the other edge on the same flange portion, during welding or during a supplemental heating operation incident to welding.

Each of these instances of beam distortion, namely web buckling, beam sweep and beam camber, are generally undesirable and detract from the commercial value of the welded beam.

SUMMARY OF THE INVENTION

In accordance with the present invention, there is provided a method for producing welded beams without web buckle, beam sweep or beam camber. All of this is accomplished by subjecting the beam to a supplemental heating operation, incident to and no later than the welding operation, to provide the entire cross section of the beam with a substantially uniform temperature at the beginning of cooling following welding, there being no heating operation performed after the welding operation and before cooling following welding.

As used herein, the term "substantially uniform temperature" refers to a temperature condition in which the temperature differential between any two points on a cross section of the beam is less than that which causes distortion (buckling, sweep, camber) upon cooling following welding.

To avoid beam camber, that flange portion, which tends to curve convexly on the outside when camber occurs, is heated during the supplemental heating operation; and to deter beam sweep, that flange edge, which curves conversely when sweep occurs, is heated during the supplemental heating operation.

To prevent web buckling, the web portion is subjected to a supplemental heating operation so that the temperature of the web portion is substantially the same as the temperature of the flange portions at the beginning of cooling following welding. When the web portion is subjected to supplemental heating, it is important that the web portion be heated on both sides simultaneously because this minimizes buckling more so than merely heating the web on one side, and it also assists in minimizing beam sweep.

The supplemental heating temperatures for the three beam portions may vary from beam portion to beam portion depending upon the cross-sectional area of the particular beam portion and the temperature to which the beam portion is heated by the welding operation alone. In some instances, supplemental heating of the flange portion having the smaller cross section is not performed. The important consideration is that the supplemental heating operation be controlled to provide a substantially uniform temperature across the entire cross section of the beam at the beginning of cooling following welding.

The presence or absence of this uniform temperature condition can be initially determined by attaching a series of closely spaced thermocouples along the cross-sectional dimensions of the beam and noting the temperature differential, if any, among thermocouples. Depending upon the thermocouple readings, and upon visual observations of distortion, as described above, heat can be applied or removed at pertinent locations along the cross section, in accordance with the present invention, to provide the desired condition. As a practical matter, visual observations alone should suffice to indicate the presence or absence of the desired condition.

The ideal temperature to which the web portion is heated is the equalizing temperature for the flange portions. The equalizing temperature occurs when the entire cross section of a flange portion is at the same temperature following welding; and the equalizing temperature can be measured by attaching a series of closely-spaced thermocouples along the cross-sectional dimension of the flange portion and noting the temperature at which they all read the same. When the web portion is at the same temperature as the flange portion, the web portion and flange portions expand and contract at essentially the same rate in directions parallel to the lengthwise dimension of the web portion.

The minimum temperature to which the web portion is heated is the equalizing temperature for the flange portions resulting from welding alone without supplemental heating of the beam.

The maximum temperature to which a beam portion is heated to a temperature below that which would cause damage to the beam and below the $A_1$ temperature for the steel of which the beam is composed. Maintaining the temperature below this level is not particularly difficult because the beam is normally moving continuously past the station at which the supplemental heating operation is conducted so that there is generally not sufficient heating time involved to overheat the beam.

Other features of the invention are inherent in the structure claimed and disclosed or will become apparent to those skilled in the art from the following detailed description in conjunction with the accompanying diagrammatic drawings.

BRIEF DESCRIPTION OF THE DRAWINGS

FIG. 1 is a schematic diagram of a method for producing welded beams in accordance with the present invention;

FIG. 2 is a side elevational view illustrating a supplemental heating station for a beam produced in accordance with a method of the present invention;

FIG. 3 is a plan view of the heating station;

DESCRIPTION OF THE PREFERRED EMBODIMENTS

Figure 4:
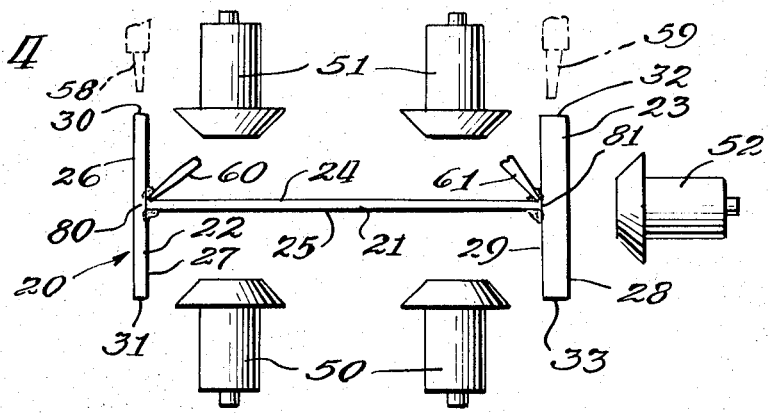
FIG. 4 is an end view showing the heating station of FIGS. 2 and 3.

Referring initially to FIGS. 1-4, a beam, indicated generally at 20, having a web portion 21, in a horizontal disposition, and a pair of opposed flange portions 22, 23, respectively, each in a vertical disposition, are moved longitudinally past a sequence of stations at which various operations for the production of a welded beam take place. These stations include a first heating station 40, for conducting a first supplemental heating operation, followed by a first welding station 41, for conducting a first welding operation, after which the beam is turned over, at a station 42, and then subjected to a second supplemental heating operation, at a station 43, followed by a second welding operation at a station 44. The beam undergoes cooling following welding during passage between stations 41 and 43, and after passing station 44.

The purpose of the two heating stations 40, 43 is to subject the beam to a supplemental heating operation, before welding, to provide the entire cross section of the beam with a substantially uniform temperature at the beginning of cooling following welding. There is no heating after welding and before cooling following welding.

FIGS. 2, 3 and 4 illustrate, in greater detail, the location of the various heating elements used for subjecting the beam to a supplemental heating operation; and the illustrations in FIGS. 2-4 are applicable to both the first and second heating stations 40, 43. FIG. 4 specifically illustrates a beam undergoing a second welding operation with welding electrodes 60, 61 located above web portion 21 at opposite edges 80, 81 thereof.

At each heating station 40, 43 the beam 20 is heated by a plurality of gas burners 50, 51, 52 which direct flames against the various portions of the beam.

A pair of lower burners 50 direct flames against the lower surface 25 of web portion 21, and, at the same time, a pair of upper burners 51 direct flames against the upper surface 24 of web portion 21; and the flames heat areas on the respective surfaces 24, 25 relatively remote from the web edges 80, 81 at which welding occurs (FIG. 4).

Figure 9:
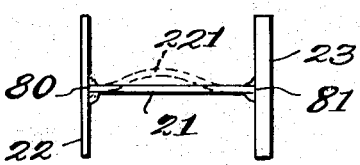
FIG. 9 is an end view of a welded beam showing web buckle in dotted lines.

A purpose of burners 50, 51 is to prevent web buckle, resulting from welding the beam at edges 30, 31. Web buckling, illustrated at 221 in FIG. 9, would occur in the absence of burners 50, 51 because of the wide differential in temperature between the flange portions and web portion 21, especially the areas of web portion 21 relatively remote from edges 80, 81. Utilizing burners 50, 51, the temperature of web portion 21, upon cooling following welding, can be controlled to be substantially uniform for the entire cross section of the web portion and to be substantially the same temperature as the flange portions; and this will minimize web buckle.

It is desirable to heat web portion 21 from both above and below, because this provides for a more uniform distribution of heat throughout the web portion than if the web portion were merely heated from either above alone or below alone. It is also desirable to heat the web portion from both above and below to prevent beam sweep.

Figure 7:
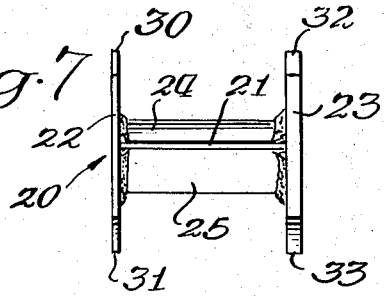
FIG. 7 is an end view of a welded beam which has undergone sweep.
Figure 8:
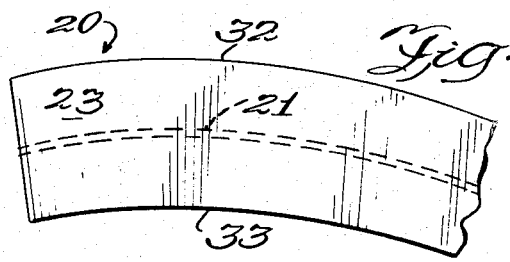
FIG. 8 is a top view of a welded beam which has undergone sweep.

A beam which has undergone sweep is illustrated in FIGS. 7 and 8. Sweep occurs when one edge of a flange portion has been heated to a substantially higher temperature than the opposite edge of the same flange portion. When this happens, the beam will curve so that the web portion no longer lies in a straight plane. Thus, if beam 20 were to undergo sweep, edge 32 on flange portion 23 would be curved convexly while opposite edge 33 would be curved concavely; and edge 30 on flange portion 22 would be curved convexly and opposite edge 31 would be curved concavely.

When sweep occurs, this means that that part of a flange portion relatively close to the concavely curved edge (e.g., edge 33 on flange portion 23) has been heated to a substantially higher temperature than that part of the flange portion relatively close to the convexly curved edge (e.g., edge 32 on flange portion 23). This substantial differential in temperature can be overcome by applying heat to the convexly curved edge of the flange portion (e.g., edge 32 on flange portion 23); and this will assist in eliminating sweep. One or more edge heaters, shown in dash-pot lines at 58, 59 (FIG. 4) may be used for this purpose.

Sweep can occur if a web portion is heated on one side only during the supplemental heating operation; and, in such a situation, the flange edge closed to the web surface undergoing heating would be heated to a higher temperature than the flange edge more remote from the web surface undergoing heating. For example, if only burners 50 were utilized to heat web portion 21, so that only lower surface 25 of web portion 21 was subjected to direct flame impingement, edge 33 of flange portion 23, which is closer to surface 25 than is opposite flange edge 32, could be heated to a higher temperature than edge 32.

Figure 10:
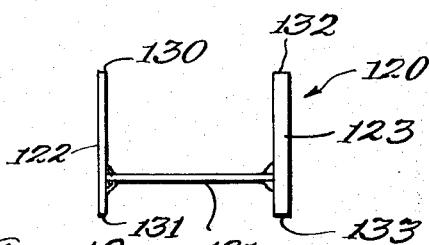
FIG. 10 is an end view of a welded beam in which the web portion is off-center relative to the flange portions.

Sweep can also occur if the web portion is off-center relative to the flange portions; and this is illustrated in FIG. 10 wherein beam 120 includes a web portion 121 located off-center relative to each flange portion 122, 123. In such a situation, heating web portion 121 with burners from both above and below would still cause a substantially higher temperature in edges 131, 133 of flanges 122, 123 than in edges 130, 132.

This problem can be overcome, however, by applying additional supplementary heat to edges 130, 132 of flange portions 122, 123, respectively, to provide the entire cross section of each flange portion with a substantially uniform temperature.

Referring to FIGS. 2–4, flange portion 23 is thicker than flange portion 22; and located at each heating station are a plurality of burners 52 located alongside thicker flange portion 23, at intervals spaced longitudinally along beam 20. A purpose of burners 52, firing against flange portion 23, is to prevent beam camber, a condition illustrated in FIGS. 5 and 6.

When the beam cambers, the flange portions of the beam are curved out of the flat planes in which they normally lie. Camber occurs when one of the flange portions is heated to a substantially higher temperature than the other flange portion. For example, in the cambered beam illustrated in FIGS. 5 and 6, flange portion 22 has been heated to a substantially higher temperature than has flange portion 23. The hotter flange portion 22 tends to curve concavely on the outside surface 26 while the cooler flange portion 23 tends to curve convexly on the outside surface 28, when camber occurs.

In the embodiment illustrated in the figures, flange portion 22 is substantially thinner than flange portion 23, so that merely heating web portion 21, to prevent web buckle, can cause camber because thinner flange portion 22 will heat to a higher temperature than thicker flange portion 23, if only the web portion is heated.

However, camber is not limited to a situation where the beam contains opposed flange portions having substantially different respective thicknesses. Camber can also occur in situations where the opposed flange portions have substantially equal thicknesses: the conditions for camber being that the respective temperatures of the two flange portions have, during the welding operation or during supplemental heating incident to the welding operation or both, become substantially different.

Camber can be prevented by subjecting the flange portion which has a tendency to curve convexly on the outer side thereof, when camber occurs, to a supplementary heating operation, so that there is substantially no temperature differential between that flange portion and the opposed flange portion, upon cooling following welding.

Figure 5:
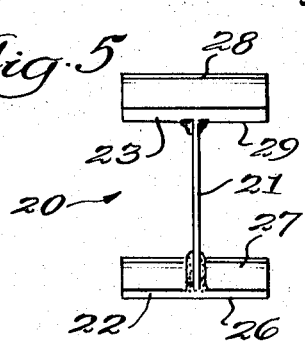
FIG. 5 is an end view of a cambered welded beam.
Figure 6:
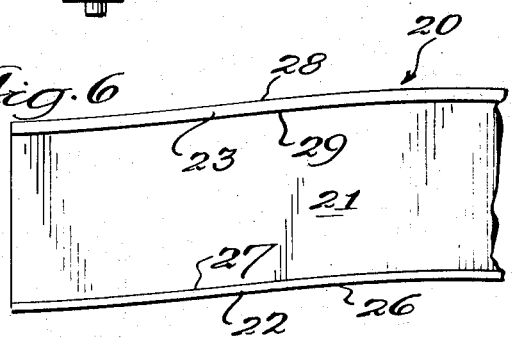
FIG. 6 is a side elevational view of a cambered welded beam.

Thus, to prevent the camber illustrated in FIGS. 5 and 6, flames from burners 52 would be directed against flange portion 23, before welding, and the heating controlled so that there is substantially no temperature differential between flange portions 22 and 23 at the beginning of cooling following welding.

In some instances, it is desirable to produce a beam having camber; and, where this is desirable, camber can be produced, in accordance with an embodiment of the present invention, merely by controlling the supplementary heating operation, incident to welding, so that one of the flange portions has a substantially higher temperature than the other flange portion at the beginning of cooling following welding.

Thus, with respect to the cambered beam illustrated in FIGS. 5 and 6, for example, the camber can be purposely produced by heating thinner flange portion 22 to a substantially higher temperature than thicker flange portion 23. This can be done either by shutting off flange heaters 52 during the supplementary heating operation and heating only web portion 21; or the camber can be produced by heating thinner flange portion 22 and not heating thicker flange portion 23. The extent to which the beam cambers depends upon the magnitude of the temperature differential between the two flange portions 22, 23; the greater the magnitude, the greater the camber, and vice versa.

A specific example of an embodiment of a method in accordance with that illustrated in the drawings produces a beam having a web portion 21 which is ¼ inch thick, a first flange portion 22 which is ⅜ inch thick and a second flange portion 23 which is ⅝ inch thick. The web portion is 30 inches deep and each of the flange portions is 8 inches wide. The beam weighs 52.3 pounds per foot.

At first heating station 40, the beam is subjected to a supplementary heating operation so that the temperature of web portion 21 is 375° F., the temperature of first flange portion 22 is 175° F. and the temperature of second flange portion 23 is 300° F. At second heating station 43, the beam is subjected to a supplementary heating operation so that the temperature of web portion 21 is 400° F., the temperature of first flange portion 22 is 200° F. and the temperature of second flange portion 23 is 325° F.

Supplemental heat is supplied to each of the beam portions during the two welding operations at 41 and 44. By heating the beam portions to the temperatures described above during the supplementary heating operation, the entire cross-section of the beam has a substantially uniform temperature, resulting from heating during both the supplemental heating operation and the welding operation, upon cooling following welding.

In a method employing the supplemental heating described in the preceding two paragraphs, there were no problems with camber or sweep and less than 5% of the beams buckled following welding; whereas, without the supplemental heating, almost half the beams buckled.

Thus, by heating the web portion on both sides, by heating the flange portion which curves convexly on the outside when the beam tends to camber, and by heating the edge of a flange portion which tends to curve convexly when sweep occurs, there can be produced a welded beam free from buckling, camber and sweep. The supplementary heating operation of the embodiment illustrated in the drawings is shown as occurring slightly before the welding operation. However, in accordance with other embodiments of the present invention, the supplemental heating operation can occur any time up to and including the time of the welding operation, there being no heating operation performed after welding and before cooling following welding.

The foregoing detailed description has been given for clearness of understanding only, and no unnecessary limitations should be understood therefrom as modifications will be obvious to those skilled in the art. For example, the method may also be used in producing welded structural shapes having channel-shaped cross sections.

What is claimed is:

1. In a method for producing a welded structural shape wherein a web portion, in a horizontal disposition, and a pair of opposed flange portions, in vertical dispositions, are moved longitudinally past a welding station at which opposite edges of the web portion are each continuously welded, from above, to a respective one of said flange portions, and the welded portions are allowed to cool following welding, the additional operation comprising:
   subjecting said structural shape to a supplemental heating operation, no later than said welding, to provide the entire cross section of the shape with a substantially uniform temperature at the beginning of said cooling following welding, there being no heating operation performed after welding and before said cooling following welding;
   said supplemental heating operation comprising heating said web portion between said opposite edges thereof, from both above and below at the same time, to deter buckling of the web and to deter sweep;
   said web portion being heated to at least the equalizing temperature of the flange portions resulting from welding alone.

2. In a method as recited in claim 1 wherein said supplemental heating operation also comprises the step of:
   heating at least one of said flange portions between its edges to prevent camber.

3. In a method as recited in claim 2 wherein:
   said structural shape has a tendency to camber in the absence of said heating of said one flange portion;
   and said step of heating said one flange portion comprises heating the flange portion which tends to curve convexly on the outside when camber occurs.

4. In a method as recited in claim 1 wherein:
   at least one of said flange portions has a tendency to sweep in the absence of heating an edge of said flange portion;
   and heating only that flange edge which tends to curve convexly when sweep occurs.

5. In a method as recited in claim 1 wherein said supplemental heating operation also comprises the step of:
   heating at least one of said flange portions between its edges to prevent camber;
   and heating an edge of at least one flange portion to prevent sweep.

6. In a method as recited in claim 5 wherein:
   said structural shape has a tendency to camber in the absence of said heating of said one flange portion;
   and said step of heating said one flange portion comprises heating the flange portion which tends to curve convexly on the outside when chamber occurs.

7. In a method as recited in claim 5 wherein:
   at least one of said flange portions has a tendency to sweep in the absence of said heating of said edge;
   and heating only that flange edge which tends to curve convexly when sweep occurs.

8. In a method as recited in claim 5 wherein:
   said structural shape has a tendency to camber in the absence of said heating of said one flange portion;
   said step of heating said one flange portion comprises heating the flange portion which tends to curve convexly on the outside when camber occurs;
   at least one of said flange portions has a tendency to sweep in the absence of said heating of said edge;
   and said step of heating the flange edge comprises heating the flange edge which tends to curve convexly when sweep occurs.

9. In a method for producing a welded structural shape wherein a web portion, in a horizontal disposition, and a pair of opposed flange portions, in vertical dispositions, are moved longitudinally past a welding station at which opposite edges of the web portion are each continuously welded, from above, to a respective one of said flange portions, and the welded portions are allowed to cool following welding, the additional operation comprising:
   producing camber in said structural shape by heating one of said flane portions at a time no later than said welding so that said one flange portion has a substantially higher temperature than the other flange portion at the beginning of said cooling following welding, there being no heating operation performed after welding and before said cooling following welding.

10. In a method for producing a welded structural shape wherein a web portion, in a horizontal disposition, and a pair of opposed flange portions, in vertical dispositions, are moved longitudinally past a welding station at which opposite edges of the web portion are each continuously welded, from above, to a respective one of said flange portions, and the welded portions are allowed to cool following welding, and wherein at least one of said flange portions has a tendency to sweep, the additional operation comprising:
   heating only that flange edge which tends to curve convexly when sweep occurs.

11. In a method for producing a welded structural shape wherein a web portion, in a horizontal disposition, and a pair of opposed flange portions, in vertical dispositions, are moved longitudinally past a welding station at which opposite edges of the web portion are each continuously welded, from above, to a respective one of said flange portions, and the welded portions are allowed to cool following welding, the additional operation comprising:
   heating at least one of said flange portions between its edges to prevent camber.

12. In a method as recited in claim 11 wherein:
   said structural shape has a tendency to camber in the absence of said heating of said one flange portion;
   and said step of heating said one flange portion comprises heating the flange portion which tends to curve convexly on the outside when camber occurs.

13. In a method as recited in claim 11:
   heating an edge of at least one flange portion to prevent sweep.

14. In a method as recited in claim 13 wherein:
   at least one of said flange portions has a tendency to sweep in the absence of said heating of said edge;
   and said step of heating the flange edge comprises heating only that flange edge which tends to curve convexly when sweep occurs.

15. In a method as recited in claim 13 wherein:
   said structural shape has a tendency to camber in the absence of said heating of said one flange portion;
   said step of heating said one flange portion comprises heating the flange portion which tends to curve convexly on the outside when camber occurs;
   at least one of said flange portions has a tendency to sweep in the absence of said heating of said edge;
   and said step of heating the flange edge comprises heating only that flange edge which tends to curve convexly when sweep occurs.

References Cited

UNITED STATES PATENTS

| | | | |
|---|---|---|---|
| 1,889,780 | 12/1932 | Fricky | 29—497 XR |
| 2,177,127 | 10/1939 | Harter | 29—471.1 |
| 2,263,272 | 11/1941 | Moss | 29—497 XR |
| 2,299,778 | 10/1942 | Wissler | 29—447 XR |
| 3,217,659 | 11/1965 | Ford | 29—471.1 XR |

(Other references on following page)

UNITED STATES PATENTS

| | | | |
|---|---|---|---|
| 3,246,392 | 4/1966 | Altgelt | 29—497 XR |
| 3,362,056 | 1/1968 | Preller et al. | 29—471.1 XR |
| 1,797,795 | 3/1931 | Ruhr | 219—124 XR |
| 3,101,272 | 8/1963 | Setzer | 29—155 |
| 3,199,174 | 8/1965 | Nilsson | 29—498 |
| 3,300,839 | 1/1967 | Lichti | 29—155 |
| 3,342,973 | 9/1967 | Smith | 219—124 |

OTHER REFERENCES

Welding Handbook (1942 edition), published by American Welding Society, pp. 1493–1494.

JOHN F. CAMPBELL, Primary Examiner

R. B. LAZARUS, Assistant Examiner

U.S. Cl. X.R.

29—497, 498; 219—124

PO-1050
(5/69)

UNITED STATES PATENT OFFICE
CERTIFICATE OF CORRECTION

Patent No. 3,535,768  Dated October 27, 1970

Inventor(s) C. L. Pruitt, et al.

It is certified that error appears in the above-identified patent and that said Letters Patent are hereby corrected as shown below:

Column 1, line 14, delete "structure" and insert --structural--.

Column 3, line 52, delete "to" and insert --is--.

Column 4, line 59, after 80 delete "." and insert --,--.

Column 5, line 16, delete "dash-pot" and insert --dash-dot--.

Column 5, line 20, delete "closed" and insert --closer--.

Column 7, line 57, delete "chamber" and insert --camber--.

Column 7, line 71, delete "said step of heating the flange edge comprises";

line 72, delete "the" and insert --only that--.

Column 8, line 9, delete "flane" and insert --flange--.

Signed and sealed this 30th day of March 1971.

(SEAL)
Attest:

EDWARD M. FLETCHER, JR.  WILLIAM E. SCHUYLER, JR.
Attesting Officer  Commissioner of Patents